(12) United States Patent
Hu et al.

(10) Patent No.: US 12,526,195 B2
(45) Date of Patent: Jan. 13, 2026

(54) DEVICE MANAGEMENT METHOD, APPARATUS, AND COMPUTER SYSTEM

(71) Applicant: HUAWEI TECHNOLOGIES CO., LTD., Guangdong (CN)

(72) Inventors: Tianchi Hu, Hangzhou (CN); Kejia Lan, Shenzhen (CN); Wenkai Ling, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 661 days.

(21) Appl. No.: 17/935,940

(22) Filed: Sep. 28, 2022

(65) Prior Publication Data

US 2023/0018349 A1   Jan. 19, 2023

Related U.S. Application Data

(63) Continuation of application No. PCT/CN2021/076422, filed on Feb. 10, 2021.

(30) Foreign Application Priority Data

Mar. 31, 2020  (CN) .......................... 202010247688.9

(51) Int. Cl.
*H04L 41/12*  (2022.01)
(52) U.S. Cl.
CPC .................................. *H04L 41/12* (2013.01)
(58) Field of Classification Search
CPC .......... H04L 41/12; H04L 43/10; Y02D 10/00
See application file for complete search history.

(56) References Cited

U.S. PATENT DOCUMENTS

| | | | |
|---|---|---|---|
| 7,680,096 B2 * | 3/2010 | Jenkins | H04L 45/02 370/254 |
| 2002/0064156 A1 * | 5/2002 | Minkenberg | H04Q 11/04 370/535 |
| 2014/0362859 A1 | 12/2014 | Addanki et al. | |
| 2016/0057063 A1 * | 2/2016 | Miyabe | H04L 47/16 709/224 |

FOREIGN PATENT DOCUMENTS

| | | |
|---|---|---|
| CN | 1848815 A | 10/2006 |
| CN | 101820355 A | 9/2010 |
| CN | 105897515 A | 8/2016 |
| CN | 107045486 A | 8/2017 |
| CN | 110162296 A | 8/2019 |
| CN | 110545194 A | 12/2019 |
| WO | 03063422 A1 | 7/2003 |

* cited by examiner

*Primary Examiner* — Michael A Keller

(57) ABSTRACT

A switching device is provided obtains information about devices connected to a plurality of ports of the switching device and determines response ports of the switching device based on the information about the devices connected to the plurality of ports. Different response ports of the switching device are connected to different devices, and each response port is configured to receive a management packet or a response to the management packet that is sent by a device connected to each response port in a device enumeration process.

18 Claims, 9 Drawing Sheets

DEVICE MANAGEMENT METHOD, APPARATUS, AND COMPUTER SYSTEM

CROSS-REFERENCE TO RELATED APPLICATIONS

This application is a continuation of International Application No. PCT/CN2021/076422 filed on Feb. 10, 2021, which claims priority to Chinese Patent Application No. 202010247688.9 filed on Mar. 31, 2020. The disclosures of the aforementioned applications are hereby incorporated by reference in their entireties.

TECHNICAL FIELD

The disclosure relates to the field of computer technologies, and in particular, to a device management method, an apparatus, and a computer system.

BACKGROUND

A peripheral component interconnect express (PCIe) bus is widely used in many fields as a high-speed serial computer expansion bus. Currently, a commonly used device management method in the industry is to perform management based on a PCIe device and to perform device management by using a standard PCIe topology discovery process. A tree topology structure is a hierarchical structure and is formed by vertically connecting multi-layer star structures. No loop is generated between any two devices that form the tree topology structure. Currently, a computer system using the PCIe bus supports only the tree topology structure, and the standard PCIe topology discovery process is to perform device enumeration in an in-depth traversal manner based on the tree topology structure to manage the PCIe device in the computer system. However, the path in the tree topology structure is too long and the diameter of an entire network is too large. With development of high-performance computing scenarios such as artificial intelligence (AI) and autonomous driving, computing performance of a single-core chip is limited by physical package of the chip and cannot meet a requirement, and therefore, a high-performance computing system formed by multi-chip interconnection becomes a trend. For a system formed by multi-chip interconnection, data transmission performance of inter-chip interconnection directly affects computing performance of the entire system. If the tree topology structure is used for interconnection, neither a delay nor a bandwidth can meet the requirement, and a dynamic routing feature cannot be implemented. Therefore, to enable the delay and the bandwidth to meet the requirement, the high-performance computing system formed by multi-chip interconnection usually needs to use a non-tree topology networking structure.

However, in the non-tree topology networking structure, two devices that are connected by using a plurality of physical links usually form a closed loop, and a plurality of devices form a loop. Consequently, the current standard PCIe topology discovery process and device management process are inapplicable. Therefore, how to resolve a loop in a non-tree topology structure is an urgent problem to be resolved, so that the high-performance computing system of the non-tree topology structure can use the standard PCIe topology discovery process.

SUMMARY

Embodiments of this disclosure provide a device management method, to suppress a loop in a non-tree topology structure so that a non-tree topology system can use a standard PCIe topology discovery process.

To achieve the foregoing objective, this disclosure provides the following technical solutions.

A first aspect provides a device management method, applied to a computer system. The computer system includes a switching device and a device connected to the switching device. The device connected to the switching device may include a processor, another switching device, or an acceleration device. The device management method includes a first switching device obtains information about devices connected to a plurality of ports. The first switching device may be any switching device in the computer system. The plurality of ports are some or all of ports of the first switching device. The plurality of ports successfully establish links at a data link layer. The first switching device determines response ports of the first switching device based on the information about the devices connected to the plurality of ports. Different response ports of the first switching device are connected to different devices. Each response port is configured to receive a management packet or a response to the management packet that is sent by a device connected to each response port in a device enumeration process. The first switching device is connected to a plurality of devices. Each device is connected to one or more ports of the first switching device. One response port corresponds to only one device. The response port is one of the one or more ports of the first switching device that are connected to the device. Only the response port can receive the management packet or the response to the management packet that is sent by the device connected to the response port in the device enumeration process. The response port may be any one of a plurality of ports connected to a same device. The first switching device may determine the response port in a random manner or according to a rule.

It can be learned from the first aspect that the first switching device obtains the information about the devices connected to the plurality of ports and determines the response ports of the first switching device based on information about a device connected to each port. Different response ports are connected to different devices. Each response port is configured to receive the management packet or the response to the management packet that is sent by the device connected to each response port in the device enumeration process, to suppress a loop in a non-tree topology structure. Therefore, a non-tree topology system can use a standard PCIe topology discovery process.

With reference to the first aspect, in a first possible implementation, a first switching device obtains information about devices connected to a plurality of ports includes the first switching device receives a first packet that is sent by a device connected to each of the plurality of ports. The first packet includes information about the device connected to each port.

It can be learned from the first possible implementation that, after each device in the computer system successfully establishes a link at a link layer, the first switching device may obtain, by receiving the first packet that is sent by the device connected to each of the plurality of ports, the information about the device connected to each port. This can ensure accuracy in obtaining the information.

With reference to the first aspect or the first possible implementation of the first aspect, in a second possible implementation of the first aspect, each port of the first switching device corresponds to one port register. The port register is used to record the information about the device connected to each port, for example, a type and an identifier of the device. After the first switching device obtains the information about the devices connected to the plurality of ports, the method further includes: The first switching device updates information recorded in the port register corresponding to each port.

It can be learned from the second possible implementation that, after obtaining the information about the devices connected to the plurality of ports, the first switching device promptly updates the information recorded in the port register corresponding to each port. When needing to determine the information about the device connected to each port, the first switching device can directly obtain the information about the device connected to the port by reading the port register of the corresponding port. This can speed up information obtaining, and ensure accuracy in obtaining the information.

With reference to any one of the first aspect or the first to the second possible implementations of the first aspect, in a third possible implementation of the first aspect, the method further includes the first switching device sends a second packet to the device connected to each port. The second packet includes information about the first switching device.

With reference to any one of the first aspect or the first to the third possible implementations of the first aspect, in a fourth possible implementation of the first aspect, that the first switching device determines response ports of the first switching device based on the information about the devices connected to the plurality of ports includes the first switching device traverses the information about the devices connected to the plurality of ports, determines a response port corresponding to each device connected to the plurality of ports, and when at least two ports are connected to a same target device, determines one of the at least two ports as a response port corresponding to the target device and processes a non-response port so that the non-response port does not return a response or returns a message indicating that the port does not exist in the device enumeration process. Processing the non-response port may be performing a port setting operation on the non-response port. The port setting operation refers to performing, based on the response port, processing on one or more ports that are connected to the same device as the response port, for example, setting a flag bit for one or more ports that are connected to the same device as the response port.

It can be learned from the fourth possible implementation of the first aspect that the response port corresponding to each device connected to the first switching device is determined, and one or more non-response ports of the same device connected to each response port are processed, so that only the response port can receive the management packet or the response to the management packet that is sent by the device connected to the response port in the device enumeration process, and the non-response port does not return the response or returns the message indicating that the port does not exist in the device enumeration process. This can well suppress a loop in a non-tree topology structure and ensure that a non-tree topology system can use a standard PCIe topology discovery process.

With reference to any one of the first aspect or the first to the fourth possible implementations of the first aspect, in a fifth possible implementation of the first aspect, the response ports of the first switching device include an uplink port. That the first switching device determines response ports of the first switching device based on the information about the devices connected to the plurality of ports includes: The first switching device determines the uplink port based on the information about the devices connected to the plurality of ports. The uplink port is configured to receive a management packet that is sent by a processor in the device enumeration process. Another port, other than the uplink port, in the response ports of the first switching device is configured to receive a response to a management packet in the device enumeration process from the device connected to the response port.

With reference to the fifth possible implementation of the first aspect, in a sixth possible implementation of the first aspect, that the first switching device determines the uplink port based on the information about the devices connected to the plurality of ports includes the first switching device determines that the processor exists in the devices connected to the plurality of ports. The first switching device determines a port connected to the processor as the uplink port. When the first switching device determines, based on the information about the devices connected to the plurality of ports, that the processor exists in the devices connected to the plurality of ports, the first switching device may directly set the response port connected to the processor as the uplink port.

With reference to the fifth possible implementation of the first aspect, in a seventh possible implementation of the first aspect, that the first switching device determines the uplink port based on the information about the devices connected to the plurality of ports includes the first switching device determines that the processor does not exist in the devices connected to the plurality of ports. The first switching device receives a third packet that is sent by a second switching device, and determines the uplink port based on the third packet.

With reference to any one of the first aspect or the first to the seventh possible implementations of the first aspect, in an eighth possible implementation of the first aspect, after the first switching device obtains the information about the devices connected to the plurality of ports, the method further includes: The first switching device determines, based on the information about the devices connected to the plurality of ports, an acceleration device connected to the first switching device. The first switching device accesses the acceleration device, and maps configuration space of the acceleration device to the first switching device.

It can be learned from the eighth possible implementation of the first aspect that the configuration space of the acceleration device connected to the first switching device is mapped to the first switching device so that in the device enumeration process, the configuration space of the acceleration device connected to the first switching device can be directly obtained by the first switching device, and there is no need to explore each acceleration device. This reduces time of the entire device enumeration process.

With reference to any one of the first aspect or the first to the eighth possible implementations of the first aspect, in a ninth possible implementation of the first aspect, the information about the device includes a type and an identifier of the device. The device may include a processor, a switching device, or an acceleration device. The identifier of the device is a unique identifier used to indicate a device, such as a device ID.

A second aspect of this application provides a first switching device. The first switching device is applied to a computer system. The computer system further includes a device connected to the first switching device. The first switching device includes an obtaining unit configured to obtain information about devices connected to a plurality of ports and a determining unit configured to determine response ports of the first switching device based on the information about the devices connected to the plurality of ports obtained by the obtaining unit. Different response ports of the first switching device are connected to different devices. Each response port is configured to receive a management packet or a response to the management packet that is sent by a device connected to each response port in a device enumeration process.

It can be learned from the second aspect that the first switching device obtains the information about the devices connected to the plurality of ports and determines the response ports of the first switching device based on the information about the device connected to each port. Different response ports are connected to different devices. Each response port is configured to receive the management packet or the response to the management packet that is sent by the device connected to each response port in the device enumeration process, to suppress a loop in a non-tree topology structure. Therefore, a non-tree topology system can use a standard PCIe topology discovery process.

With reference to the second aspect, in a first possible implementation of the second aspect, the obtaining unit is configured to receive a first packet that is sent by a device connected to each of the plurality of ports. The first packet includes information about the device connected to each port.

With reference to the second aspect or the first possible implementation of the second aspect, in a second possible implementation of the second aspect, each port of the first switching device corresponds to one port register. The port register is used to record the information about the device connected to each port. The first switching device further includes an updating unit configured to, after the obtaining unit obtains the information about the devices connected to the plurality of ports, update information recorded in the port register corresponding to each port.

With reference to any one of the second aspect or the first to the second possible implementations of the second aspect, in a third possible implementation of the second aspect, the first switching device further includes a sending unit configured to send a second packet to a device connected to each port. The second packet includes information about the first switching device.

With reference to any one of the second aspect or the first to the third possible implementations of the second aspect, in a fourth possible implementation of the second aspect, the determining unit is configured to traverse the information about the devices connected to the plurality of ports, determine a response port corresponding to each device connected to the plurality of ports, and when at least two ports are connected to a same target device, determine one of the at least two ports as a response port corresponding to the target device and process a non-response port so that the non-response port does not return a response or returns a message indicating that the port does not exist in the device enumeration process.

With reference to any one of the second aspect or the first to the fourth possible implementations of the second aspect, in a fifth possible implementation of the second aspect, the response ports of the first switching device include an uplink port. The determining unit is configured to determine the uplink port based on the information about the devices connected to the plurality of ports obtained by the obtaining unit. The uplink port is configured to receive a management packet that is sent by a processor in the device enumeration process.

With reference to the fifth possible implementation of the second aspect, in a sixth possible implementation of the second aspect, the determining unit is configured to determine that the processor exists in the devices connected to the plurality of ports and determine a port connected to the processor as the uplink port.

With reference to the fifth possible implementation of the second aspect, in a seventh possible implementation of the second aspect, the determining unit is configured to determine that the processor does not exist in the devices connected to the plurality of ports, receive a third packet that is sent by a second switching device, and determine the uplink port based on the third packet.

With reference to any one of the second aspect or the first to the seventh possible implementations of the second aspect, in an eighth possible implementation of the second aspect, the determining unit is further configured to after the obtaining unit obtains the information about the devices connected to the plurality of ports determine, based on the information about the devices connected to the plurality of ports, an acceleration device connected to the first switching device, access the acceleration device and map configuration space of the acceleration device to the first switching device.

With reference to any one of the second aspect or the first to the eighth possible implementations of the second aspect, in a ninth possible implementation of the second aspect, the information about the device includes a type and an identifier of the device.

A third aspect of this application provides a switching chip. The switching chip is configured to perform the method in any one of the first aspect or the first to the ninth possible implementations of the first aspect.

A fourth aspect of this application provides a computer system. The computer system includes a first switching device and a device connected to the first switching device. The device connected to the first switching device is configured to send information about a device to the first switching device. The first switching device is configured to perform the method in any one of the first aspect or the first to the ninth possible implementations of the first aspect.

A fifth aspect of this application provides a computer storage medium. The computer storage medium may be non-volatile. The computer storage medium stores computer-readable instructions. When the computer-readable instructions are executed by a processor, the method in the first aspect or any possible implementation of the first aspect is performed.

In embodiments of this application, according to the device management method, the first switching device obtains the information about the devices connected to the plurality of ports and determines the response ports of the first switching device based on the information about the device connected to each port. Different response ports are connected to different devices. Each response port is configured to receive the response to the management packet in the device enumeration process from the device connected to each response port to suppress the loop in the non-tree topology structure. Therefore, the non-tree topology system can use the standard PCIe topology discovery process.

DESCRIPTION OF EMBODIMENTS

To make objectives, technical solutions, and advantages of the present invention more clear, the following describes embodiments of this disclosure with reference to the accompanying drawings. It is clear that the described embodiments are merely illustrative of some rather than all possible embodiments. A person of ordinary skill in the art may learn that, as a new scenario emerges, the technical solutions provided in embodiments of this disclosure are also applicable to a similar technical problem.

In this specification, claims, and accompanying drawings, the terms "first", "second", and the like are intended to distinguish between similar objects but do not necessarily indicate a specific order or sequence. It should be understood that the data termed in such a way is interchangeable in proper circumstances so that embodiments described herein can be implemented in orders other than the order illustrated or described herein. In addition, the terms "include" and "have" and any variations thereof are intended to cover non-exclusive inclusions, for example, a process, method, system, product, or device including a series of steps or modules need not be limited solely to those listed steps or modules, but may include other steps or modules that are not listed or are inherent to these processes, methods, products, or devices. Naming or numbering of steps in this disclosure does not mean that the steps in the method procedures need to be performed in a time/logical order indicated by the naming or numbering. An execution order of the steps in the procedures that have been named or numbered can be changed based on a technical objective to be achieved so as long as same or similar technical effects can be achieved. Division into the modules in this disclosure is logical division, and may be other division during actual implementation. For example, a plurality of modules may be combined or integrated into another system, or some features may be ignored or may not be performed. In addition, the displayed or discussed mutual couplings or direct couplings or communication connections may be implemented through some interfaces. The indirect couplings or communication connections between the modules may be implemented in electrical or other similar forms. This is not limited in this disclosure. In addition, the modules or submodules described as separate parts may or may not be physically separate, may or may not be physical modules, or may be distributed on a plurality of circuit modules. Some or all of the modules may be selected based on an actual requirement to implement the objectives of the solutions of this disclosure.

Figure 1:
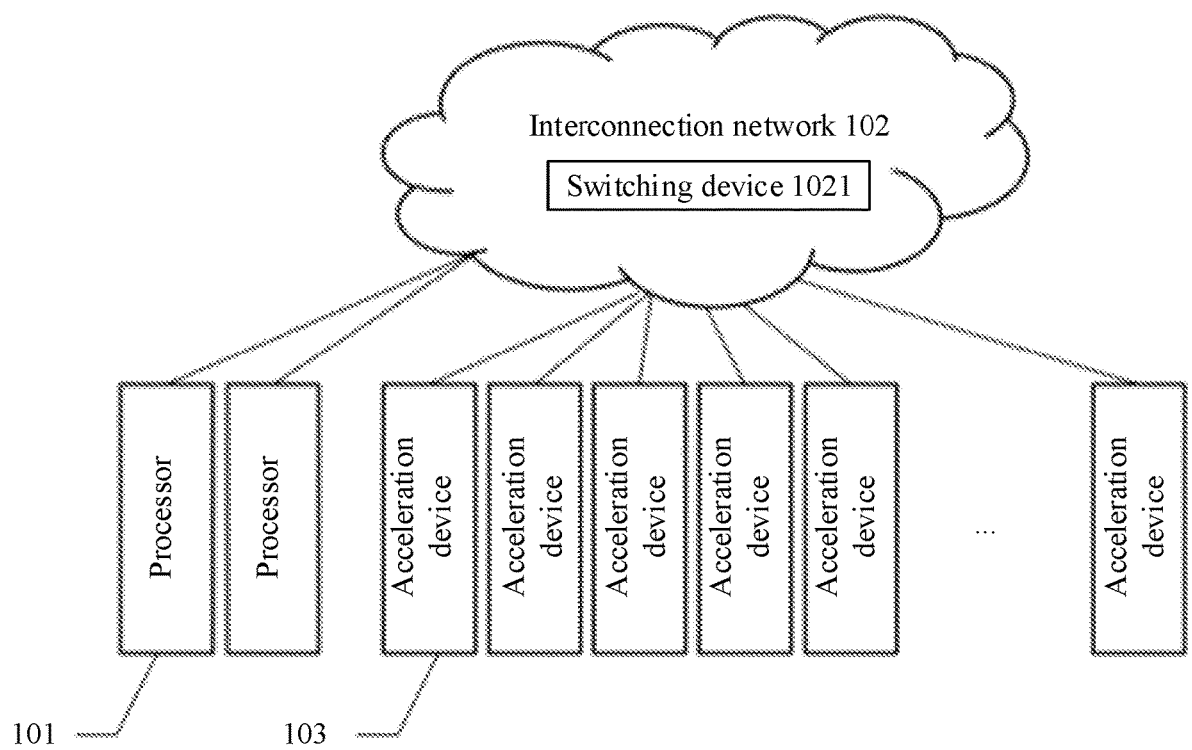
FIG. 1 is a schematic diagram of a structure of a computer system according to an embodiment.

The method in embodiments of this disclosure may be applied to a computer system of various servers, for example, an X86 server, an advanced reduced instruction set computing machine (ARM) server, or a performance optimized with enhanced RISC (POWER) server. FIG. 1 is a schematic diagram of an architecture of a computer system according to an embodiment.

Referring to FIG. 1, the computer system provided in this embodiment may include one or more processors 101, an interconnection network 102, and one or more acceleration devices 103. The processor 101 in this embodiment may be a central processing unit (CPU). The acceleration device 103 may be a graphics processing unit (GPU), a field programmable gate array (FPGA), an artificial intelligence (AI) chip, or the like. The interconnection network 102 part includes one or more switching devices 1021, configured to connect the processor 101 and the acceleration device 103. The switching device in this embodiment of this application may be a PCIe switch chip. Quantities of the processor 101, the switching device 1021 included in the interconnection network 102, and the acceleration device 103 included in the interconnection network 102 are not limited in this embodiment. The interconnection network 102 part uses a high-speed memory bus protocol for interconnection and uses a non-tree topology to reduce end-to-end latency between the processor 101 and the acceleration device 103, and to add features such as multipath and dynamic routing.

Figure 2:
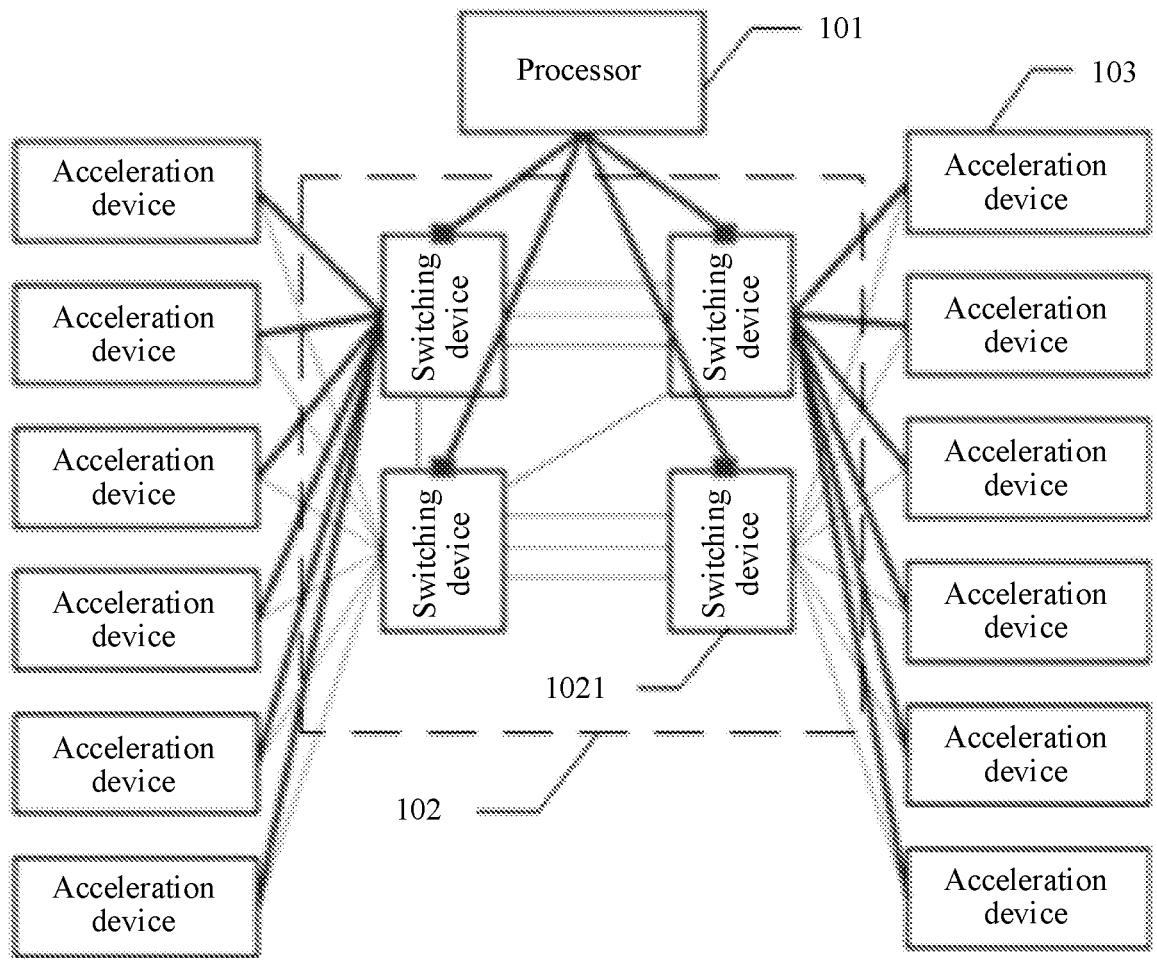
FIG. 2 is a connection diagram of an interconnection network according to an embodiment.

FIG. 2 is a connection diagram of an interconnection network 102 according to an embodiment of this application.

FIG. 2 shows a non-tree topology structure in which one processor 101 is connected to 10 acceleration devices by using four switching devices 1021. It should be noted that FIG. 2 is merely an example and should not be understood as a limitation on a structure of the interconnection network 102.

Figure 3A:
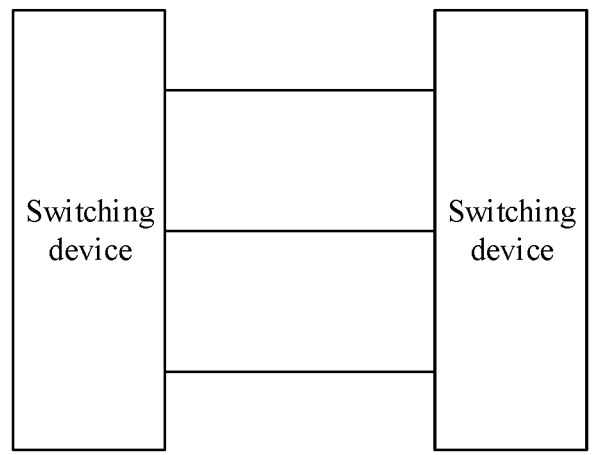
FIG. 3(a) is a schematic diagram of a topological loop structure of an interconnection network according to an embodiment.
Figure 3B:
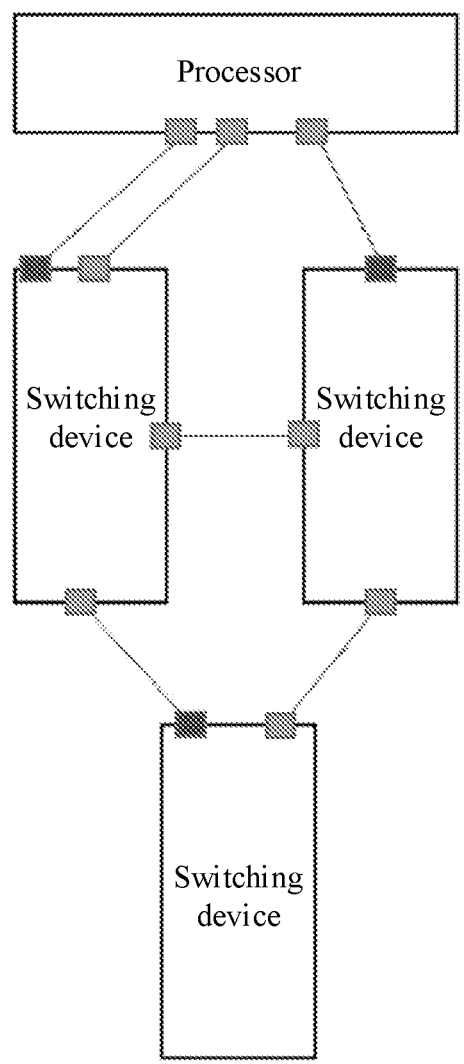
FIG. 3(b) is a schematic diagram of another topological loop structure of an interconnection network according to an embodiment.

It can be seen from FIG. 2 that the non-tree topology of the interconnection network 102 may include two types of topological loop structures shown in FIG. 3(a) and FIG. 3(b). In a first type of topological loop structure shown in FIG. 3(a), there are a plurality of physical links between two switching devices 1021. In a second type of topological loop structure shown in FIG. 3(b), a loop is formed between a plurality of switching devices 1021. It should be noted that FIG. 3(a) and FIG. 3(b) are examples of the two types of topological loop structures in a non-tree topology structure of the interconnection network 102 provided in this embodiment of this application and should not be understood as a limitation on this application. Because a plurality of topological loop structures appear in a non-tree topology structure in a process of enumerating devices in a network at an initialization stage (that is, a PCIe scanning process, or referred to as a PCIe topology discovery process), an exploration loop occurs, and a topology structure of the device cannot be quickly and effectively obtained.

Figure 4:
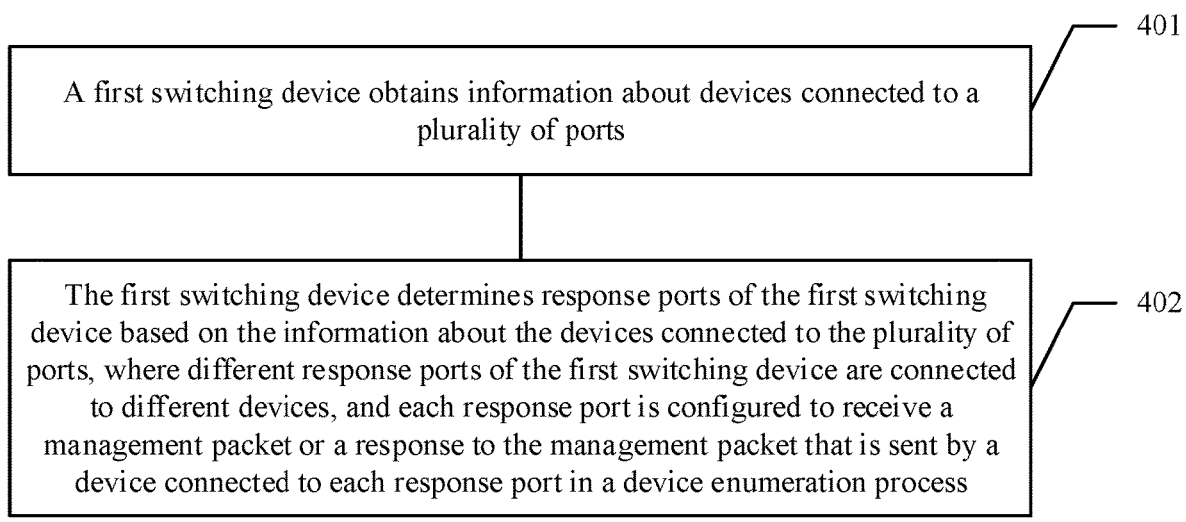
FIG. 4 is a schematic diagram of an embodiment of a device management method according to an embodiment.

Based on the foregoing computer system and the structure of the interconnection network having the non-tree topology, an embodiment provides a device management method, as shown in FIG. 4.

FIG. 4 is a schematic diagram of an embodiment of the device management method according to an embodiment of this application. The method may include the following steps.

401: A first switching device obtains information about devices connected to a plurality of ports.

In this embodiment, the first switching device may be any one of one or more switching devices 1021 included in the interconnection network 102. After another device and a plurality of ports included in the first switching device successfully establish a link at a link layer, the first switching device first obtains information about a device connected to each of the plurality of ports. The plurality of ports are some or all of all ports included in the first switching device.

It should be noted that, after each device in a computer system successfully establishes a link at a link layer, each device sends a packet carrying information about the device to a device connected to each port. Therefore, in this embodiment, the first switching device may obtain, by receiving the first packet that is sent by the device connected to each of the plurality of ports, the information about the devices connected to the plurality of ports. The first switching device may determine, based on the first packet that is sent by the device connected to each port, the information about the device connected to each port. In addition, the first switching device may also carry the information about the device in a second packet and send, through each of the plurality of ports, the second packet to the device connected to each port, thereby implementing point-to-point information exchange.

Optionally, in this embodiment, the information about the device may include a type and an identifier of the device. For example, the device may be a switching device, a processor, or an acceleration device. The identifier of the device is an ID of the device. Devices of a same type have their unique IDs.

Figure 5:
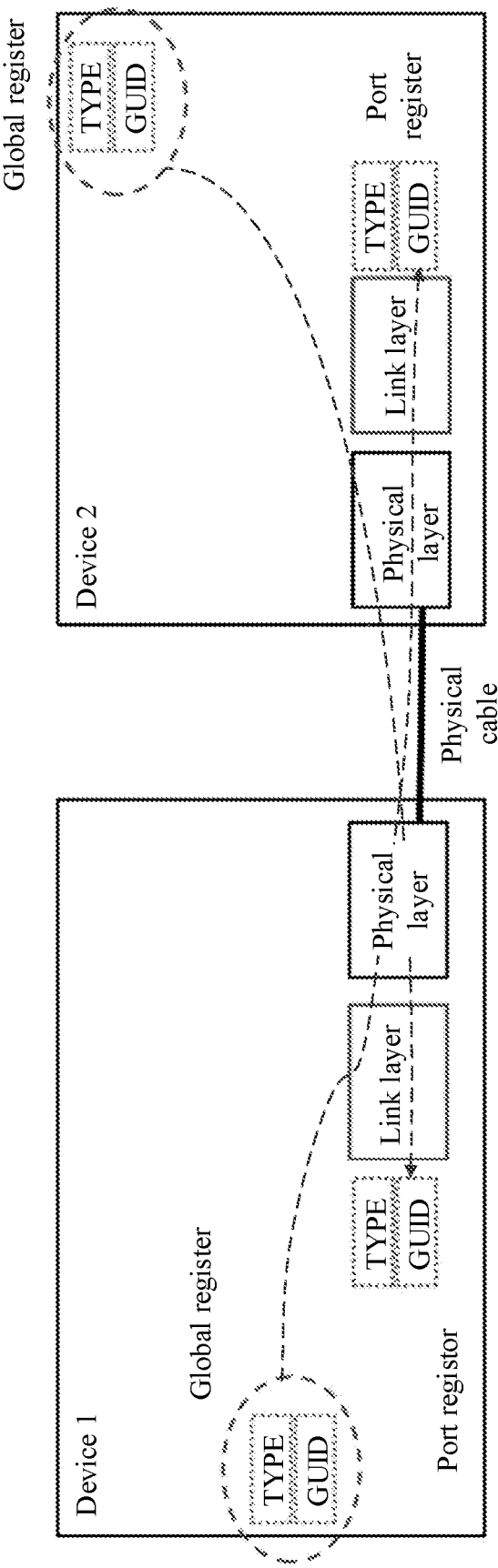
FIG. 5 is a schematic diagram of a structure of link establishment at a link layer performed by two devices according to an embodiment.

Optionally, in this embodiment, each device may include two global registers. One global register is used to indicate a type of the device, and the other global register is used to indicate an identifier of the device, for example, a GUID. Each port of each device may correspond to one port register. The port register is configured to record information about a device connected to the port, for example, a type and an identifier of the device. After two devices, for example, a device 1 and a device 2, successfully establish a link at a link layer, and perform the foregoing point-to-point information exchange process, the two devices update information recorded in port registers of ports of the devices, to identify the information about the device connected to each port. FIG. 5 is a schematic diagram of a structure of link establishment at the link layer performed by the two devices according to an embodiment of this application.

402: The first switching device determines response ports of the first switching device based on the information about the devices connected to the plurality of ports. Different response ports of the first switching device are connected to different devices. Each response port is configured to receive a management packet or a response to the management packet that is sent by a device connected to each response port in a device enumeration process.

In this embodiment, after obtaining the information about the devices connected to the plurality of ports, the first switching device determines the response ports of the first switching device based on the information about the device connected to each port. The first switching device is connected to a plurality of devices. Each device is connected to one or more ports of the first switching device. The first switching device determines, based on the information about devices connected to the plurality of ports, ports that are connected to a same device. Different response ports are connected to different devices. The response port of the first switching device is configured to receive a management packet that is sent by a device connected to the response port in the device enumeration process, or is configured to receive a response to the management packet in the device enumeration process from the device connected to the response port. In other words, one response port corresponds to only one device. The response port is one of the one or more ports of the first switching device that are connected to the device. Another port may be considered as a non-response port. Only the response port receives the management packet that is sent by the device in the device enumeration process or receives the response to the management packet in the device enumeration process from the device. The non-response port does not receive, from the device, the management packet that is sent by the device in the device enumeration process or the response to the management packet in the device enumeration process. Optionally, the non-response port may also return a message indicating that the port does not exist, thereby preventing an exploration loop.

In this embodiment, the response port may be any one of a plurality of ports connected to a same device. The first switching device may determine the response port in a random manner or according to a rule. This is not limited in this embodiment. Preferably, this embodiment provides a specific implementation in which, after obtaining the information about the devices connected to the plurality of ports, the first switching device determines the response ports of the first switching device based on the information about the devices connected to the plurality of ports, as shown in FIG. 6.

Figure 6:
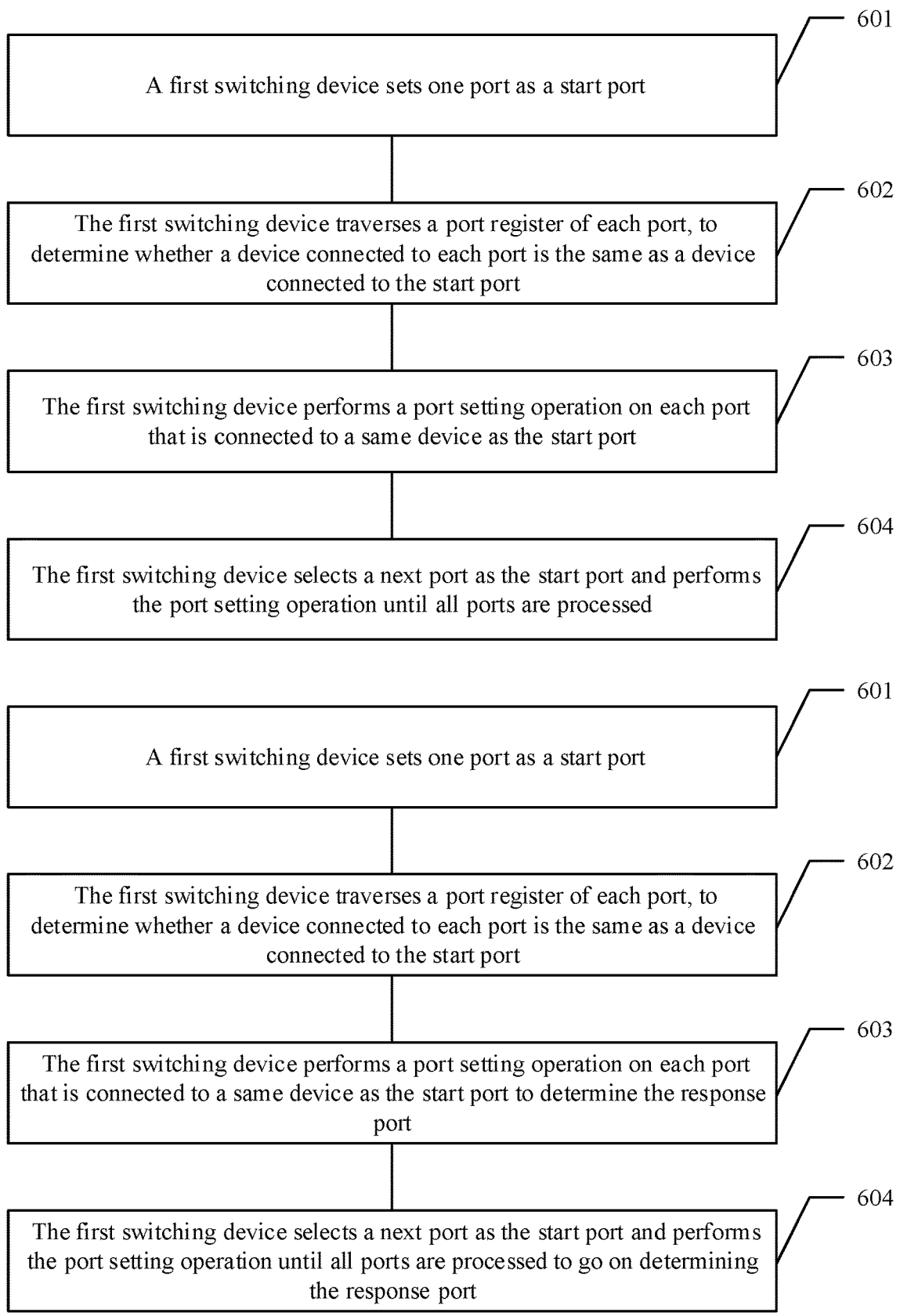
FIG. 6 is a schematic diagram of an embodiment of a method for determining a response port by a first switching device according to an embodiment.

FIG. 6 is an embodiment of a method for determining the response port by the first switching device according to an embodiment. The method may include the following steps.

601: The first switching device sets one port as a start port.

In this embodiment, after obtaining the information about the devices connected to the plurality of ports, the first switching device updates the information recorded in the port register of each port and records the information about the connected devices, for example, types and identifiers of the devices. The first switching device may obtain the information about the device connected to the port by reading content recorded in the port register.

The first switching device first sets a start port from the plurality of ports. The start port may be any one of the plurality of ports. For example, there are 50 ports included in the first switching device. The plurality of ports are successively numbered 0, 1, 2, . . . , 47, 48, and 49. The first switching device may set a port 0 as a start port. A port register of the start port records a device connected to the start port as a device A.

602: The first switching device traverses the port register of each port to determine whether the device connected to each port is the same as the device connected to the start port.

In this embodiment, after the start port is set, the first switching device traverses a port register of each of other ports and determines whether device information recorded in the port register of each port is the same as device information recorded in the port register of the start port. If the device information recorded in the port register of each port is the same as the device information recorded in the port register of the start port, it indicates that the port and the start port are connected to the same device A. If the device information recorded in the port register of each port is different from the device information recorded in the port register of the start port, it indicates that the port and the start port are connected to different devices.

603: The first switching device performs a port setting operation on each port that is connected to a same device as the start port to determine the response port.

In this embodiment, if a device connected to one or more ports is the same as the device connected to the start port during traversal, the first switching device performs the port setting operation on each of the one or more ports.

In this embodiment, the port setting operation refers to performing, based on the start port, processing on one or more ports that are connected to the same device as the start port. Preferably, a processing manner may be setting a flag bit for one or more ports that are connected to the same device as the start port. For example, it is assumed that a flag bit for a normal port is 0, and after a plurality of ports of the first switching device successfully establish a link at the link layer, a flag bit for each port is 0. After the port 0 is set as the start port, if the first switching device determines that a port 5 and a port 6 are connected to a same device as the port 0 during traversal, the first switching device sets flag bits for the port 5 and the port 6 to 1, to implement a port setting operation on the port 5 and the port 6. As a normal port, the port 0 is a response port connected to the device A. In a PCIe device enumeration process, if a flag bit for a port is set, the port does not receive a management packet or a response to the management packet that is sent by a device connected to the port in the enumeration process.

604: The first switching device selects a next port as the start port and performs the port setting operation until all ports are processed to proceed with determining the response port.

In this embodiment, after the port setting operation is performed on each port that is connected to a same device as a first start port in step 601 to step 603, the first switching device selects a next port as a new start port, and repeats operations in step 602 to step 603 to complete a new round of port setting operation until all ports are processed. Each start port set by the first switching device is a response port of the first switching device.

It should be noted that, in this embodiment, the next port is a port whose flag bit is not set. A port whose flag bit is set does not participate in the new round of port setting operation.

For example, in step 601 to step 602, the port 0 is set as the start port. After the port setting operation on the one or more ports that are connected to the same device as the port 0 is completed, when a flag bit for a port 1 is not set, the first switching device may set the port 1 as a new start port, and a device connected to the port 1 as a device B. The first switching device determines, by using a same method as that in step 602 to step 603, one or more ports that are connected to a same device as the port 1, and sets the one or more ports that are connected to the same device as the port 1 to complete a new round of port setting operation until the last port is processed. The first switching device determines all response ports. In this embodiment, there is no set port, that is, each start port set by the first switching device is a response port of the first switching device.

It should be noted that the method for determining the response port by the first switching device shown in FIG. 6 is merely an embodiment of determining the response port by the first switching device in embodiments of this disclosure. The first switching device may alternatively determine the response ports of the first switching device according to another rule or in another manner. This is not limited in this embodiment.

In this embodiment, the first switching device obtains the information about the devices connected to the plurality of ports and determines the response ports of the first switching device based on the information about the device connected to each port. Different response ports are connected to different devices. Each response port is configured to receive the management packet or the response to the management packet that is sent by the device connected to each response port in the device enumeration process to suppress a loop in a non-tree topology structure. Therefore, a non-tree topology system can use a standard PCIe topology discovery process.

Optionally, in the device management method in FIG. 4, the response ports of the first switching device include an uplink port. The uplink port is used by the first switching device to receive a management packet that is sent by a device connected to the uplink port in the device enumeration process. In the device enumeration process, other ports that are not uplink ports in the response ports of the first switching device cannot receive a management packet in the device enumeration process. Each response port in the other ports is configured to receive a response to the management packet in the device enumeration process from the device connected to the response port.

Figure 7:
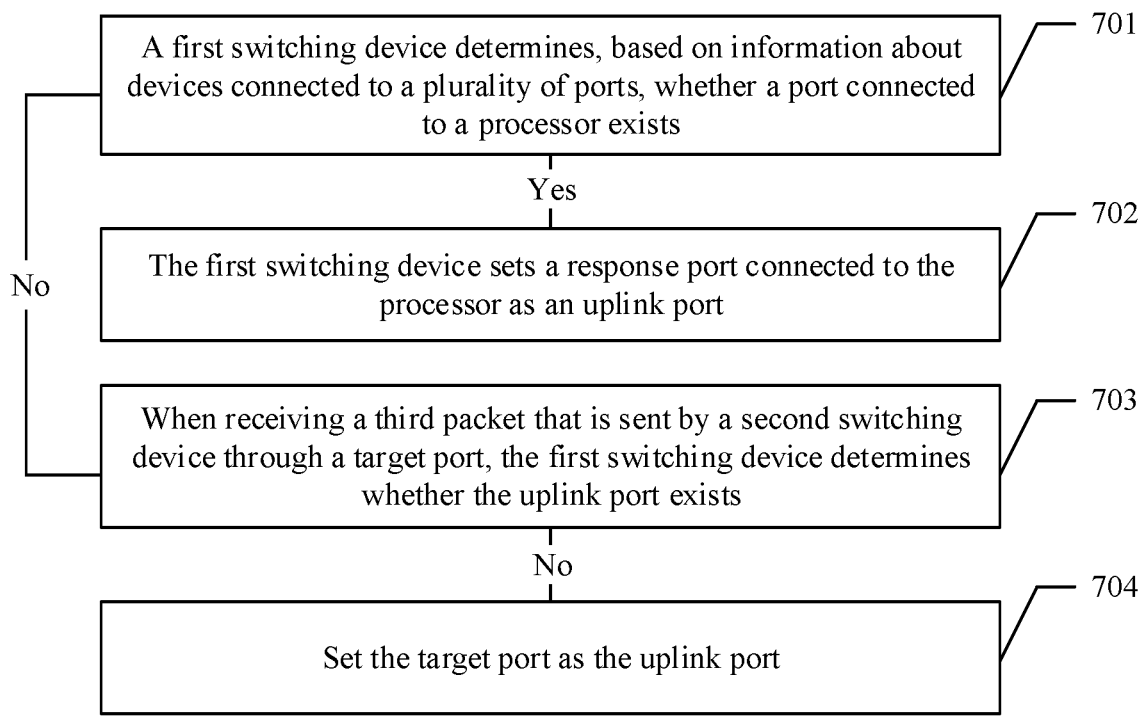
FIG. 7 is a schematic diagram of an embodiment of a method for determining an uplink port according to an embodiment.

In this embodiment, determining the uplink port is related to whether a plurality of devices connected to the first switching device include a processor. Therefore, when determining a plurality of response devices of the first switching device, the first switching device first determines, based on information about the device connected to each port, for example, by reading the port register of each port, whether the plurality of connected devices include the processor. When the processor is determined to be present, the first switching device may directly set a response port connected to the processor as the uplink port. When the plurality of devices connected to the first switching device do not include the processor, the first switching device does not first set the uplink port, and waits for a third packet that is sent by another switching device connected to the first switching device, for example, a second switching device, through a target port. The third packet is a configuration packet used to set the uplink port. The first switching device sets the uplink port based on the third packet. FIG. 7 provides a schematic diagram of an embodiment of a method for determining an uplink port.

FIG. 7 is an embodiment of a method for determining the uplink port according to an embodiment of this disclosure. The method may include the following steps.

701: The first switching device determines, based on the information about the devices connected to the plurality of ports, whether a port connected to the processor exists.

In this embodiment, in step 402 in FIG. 4, when the first switching device determines, based on the information about the devices connected to the plurality of ports, the response port of the first switching device, the first switching device further determines, based on the information about the devices connected to the plurality of ports, whether there exists a port connected to the processor.

702: When the port connected to the processor is determined to exist, the first switching device sets the response port connected to the processor as the uplink port.

In this embodiment, when the plurality of devices connected to the first switching device include the processor, the first switching device sets the response port connected to the processor as the uplink port.

Optionally, in this embodiment, after the first switching device sets the response port connected to the processor as the uplink port, if the plurality of devices connected to the first switching device further include one or more third switching devices, the first switching device may send a fourth packet to the one or more third switching devices. The fourth packet indicates the one or more third switching devices to determine the uplink port.

703: When the port connected to the processor is determined not to exist, and the first switching device receives the third packet that is sent by the second switching device through the target port, the first switching device determines whether the uplink port exists.

In this embodiment, if the plurality of devices connected to the first switching device do not include the processor, and the first switching device receives the third packet that is sent by the second switching device through the target port, the first switching device first determines whether the uplink port is set.

704: If the uplink port is not set, the target port is set as the uplink port.

When determining that the uplink port is not set, the first switching device sets the target port as the uplink port. It should be noted that, if the first switching device receives the fourth packets that are sent by the plurality of third switching devices when the uplink port is not set, the first switching device may set a port that first receives the third packet as the uplink port.

Figure 8:
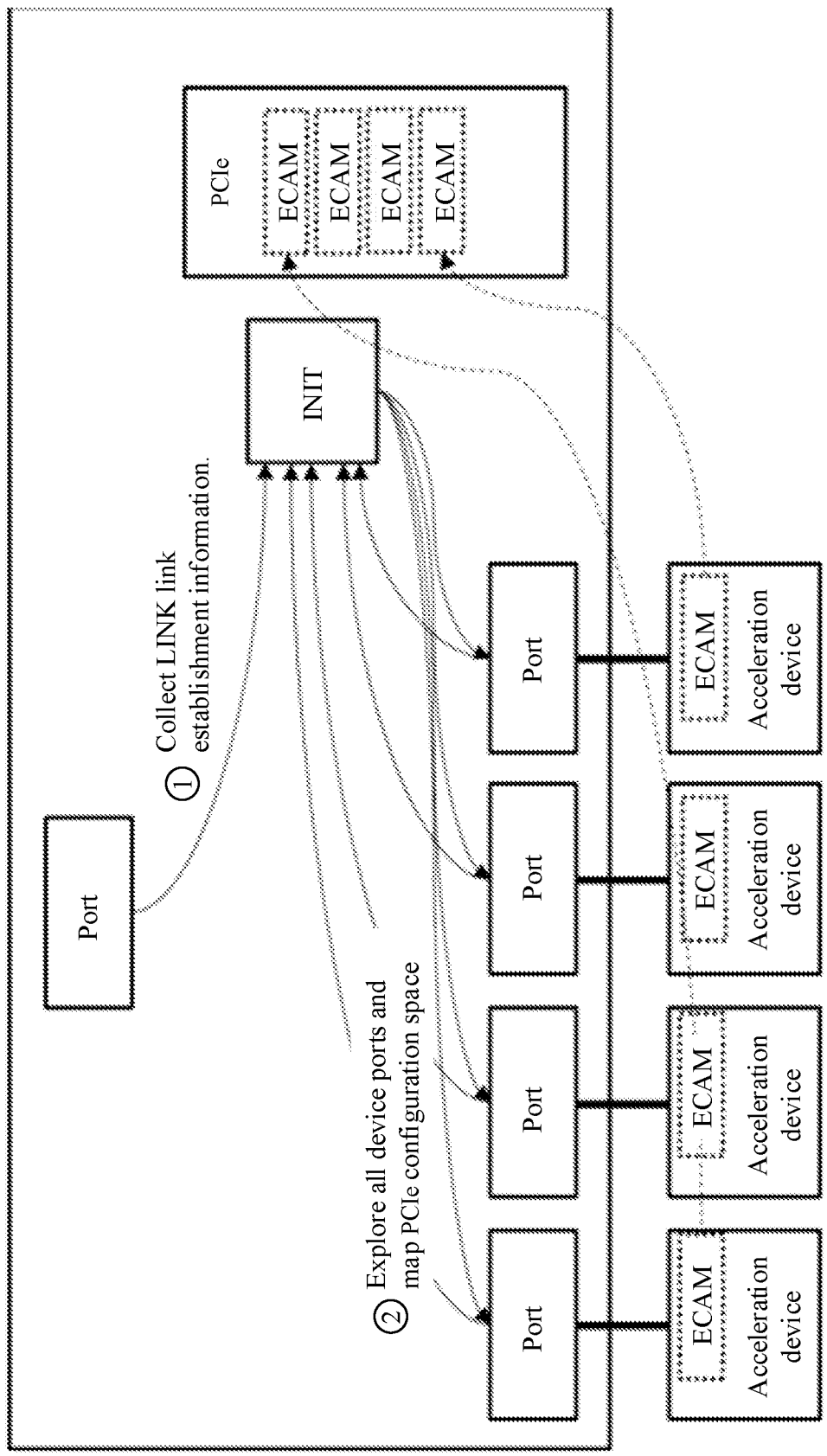
FIG. 8 is a schematic flowchart of mapping configuration space of an acceleration device to a first switching device according to an embodiment.

The foregoing describes the method for setting the uplink port in this embodiment. Optionally, if the first switching device is not connected to the processor, the first switching device may set the uplink port according to configuration information delivered by the processor. This is not limited in this embodiment Optionally, according to the foregoing embodiment, after obtaining the information about the devices connected to the plurality of ports and determining the response ports of the first switching device, the first switching device further determines, based on the information about the devices connected to the plurality of ports, acceleration devices connected to the first switching device, accesses the acceleration devices through response ports connected to the acceleration devices, and then maps PCIe configuration space of these acceleration devices to the first switching device. FIG. 8 is a schematic flowchart of mapping configuration space of the acceleration device to the first switching device according to an embodiment of this application. Referring to FIG. 8, after obtaining device information of the device connected to each of the plurality of ports, an INIT module in the switching device initiates access to the acceleration device, and then maps PCIe configuration space of all acceleration devices to an enhanced configuration access mechanism (ECAM) in the switching device. During device enumeration, the processor finds the first switching device, and may directly scan, in the first switching device, the acceleration devices connected to the first switching device one by one, without separately scanning each acceleration device, shortening PCIe enumeration time of the entire system.

The foregoing describes the device management method in this embodiment of this application. The following describes a structure of a first switching device according to an embodiment in conjunction with FIG. 9.

Figure 9:
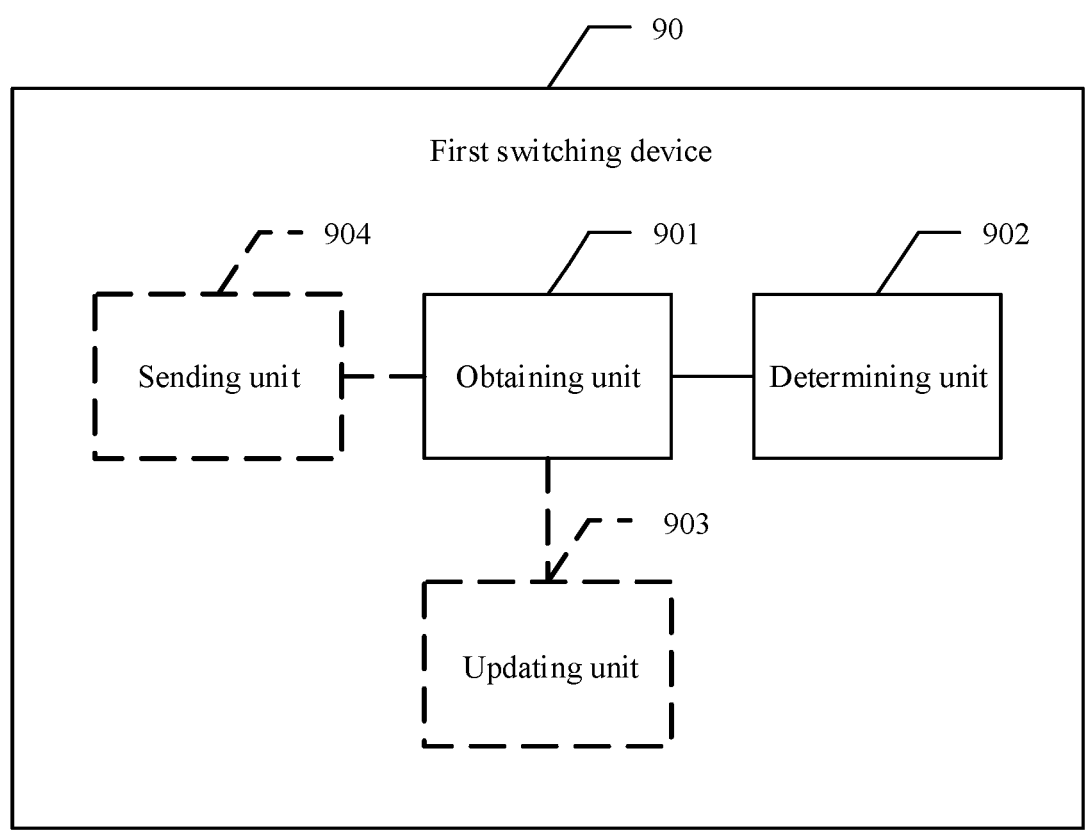
FIG. 9 is a schematic diagram of a structure of a first switching device according to an embodiment.

FIG. 9 is a schematic diagram of a structure of a first switching device according to an embodiment.

Referring to FIG. 9, a first switching device 90 pro is applied to a computer system. The computer system further includes a device connected to the first switching device 90. The first switching device 90 may include:

an obtaining unit 901, configured to obtain information about devices connected to a plurality of ports; and a determining unit 902, configured to determine response ports of the first switching device based on the information about the devices connected to the plurality of ports obtained by the obtaining unit 901. Different response ports of the first switching device are connected to different devices. Each response port is configured to receive a management packet or a response to the management packet that is sent by a device connected to each response port in a device enumeration process.

In this embodiment, the first switching device 90 obtains the information about the devices connected to the plurality of ports and determines the response ports of the first switching device based on the information about the device connected to each port. Different response ports are connected to different devices. Each response port is configured to receive the management packet or the response to the management packet that is sent by the device connected to each response port in the device enumeration process to suppress a loop in a non-tree topology structure. Therefore, a non-tree topology system can use a standard PCIe topology discovery process.

Optionally, in an embodiment, the obtaining unit 901 is configured to receive a first packet that is sent by a device connected to each of the plurality of ports. The first packet includes information about the device connected to each port.

Optionally, in an embodiment, each port of the first switching device corresponds to one port register. The port register is used to record the information about the device connected to each port. The first switching device further includes an updating unit 903, configured to, after the obtaining unit 901 obtains the information about the devices connected to the plurality of ports, update information recorded in the port register corresponding to each port.

Optionally, in an embodiment, the first switching device 90 further includes a sending unit 904 configured to send a second packet to a device connected to each port. The second packet includes information about the first switching device.

Optionally, in an embodiment, the determining unit 902 is configured to traverse the information about the devices connected to the plurality of ports, determine a response port corresponding to each device connected to the plurality of ports, and when at least two ports are connected to a same target device, determine one of the at least two ports as a response port corresponding to the target device, and process a non-response port, so that the non-response port does not return a response or returns a message indicating that the port does not exist in the device enumeration process.

Optionally, in an embodiment, the response ports of the first switching device include an uplink port. The determining unit 902 is configured to determine the uplink port based on the information about the devices connected to the plurality of ports obtained by the obtaining unit 901. The uplink port is configured to receive a management packet that is sent by a processor in the device enumeration process.

Optionally, in an embodiment, the determining unit 902 is configured to determine that the processor exists in the devices connected to the plurality of ports, and determine a port connected to the processor as the uplink port.

Optionally, in an embodiment, the determining unit 902 is configured to determine that the processor does not exist in the devices connected to the plurality of ports, receive a third packet that is sent by a second switching device, and determine the uplink port based on the third packet.

Optionally, in an embodiment, the determining unit 902 is further configured to, after the obtaining unit 901 obtains the information about the devices connected to the plurality of ports, determine, based on the information about the devices connected to the plurality of ports, an acceleration device connected to the first switching device, access the acceleration device and map configuration space of the acceleration device to the first switching device.

Optionally, in an embodiment, the information about the device includes a type and an identifier of the device.

It should be noted that the foregoing modules or units may be implemented by using software, hardware, or a combination of software and hardware.

In this disclosure, the switching device may include one or more processors and one or more built-in or external memories. "Implementation by using software" means that the processor implements, by reading and executing program instructions stored in the memory, functions corresponding to the foregoing modules or units. The processor included in the switching device of this disclosure is a processing circuit that has a function of executing the program instructions, and is can be a processing circuit that can run the program instructions, such as a microprocessor or a microcontroller unit (MCU). These processing circuits may include one or more cores configured to execute the program instructions to perform a data computing or processing. For example: ARM soft core. In this application, the switching device may be a separately packaged semiconductor chip.

In this application, "implementation by using hardware" means that functions of the foregoing modules or units are implemented by disposing a hardware processing circuit that does not have a function of processing the program instructions on each physical port of the switching device. The hardware processing circuit may include a discrete hardware component, or may be an integrated circuit. To reduce power consumption and a size, an integrated circuit is usually used for implementation. The hardware processing circuit may include an application-specific integrated circuit (ASIC) or a programmable logic device (PLD). The PLD may further include a field programmable gate array (FPGA), a complex programmable logic device (CPLD), and the like. These hardware processing circuits each may be a separately packaged semiconductor chip.

It should be noted that, when the embodiments of this disclosure are implemented by using software, hardware, or a combination of software and hardware, this disclosure may be implemented by using different software and hardware, which is not limited to only one type of software or hardware. It should be noted that the device provided in this embodiment of may be implemented by using hardware, or may be implemented in a software manner, which is not limited herein. For example, one of the modules or units may be implemented by using a processor, and the other module or unit may be implemented by using another processor. Similarly, when hardware is used for implementation, one of the modules or units may be implemented by using an ASIC, and the other module or unit may be implemented by using an FPGA. Certainly, some or all modules or units are not limited to be implemented by using same software or same hardware. In addition, a person skilled in the art may know that, software generally has better flexibility but poorer performance than hardware, and hardware is exactly opposite. Therefore, a person skilled in the art may select software, hardware, or a combination thereof for implementation based on an actual requirement. A person of ordinary skill in the art may be aware that, in combination with examples described in embodiments of this disclosure, units and algorithm steps may be implemented by using hardware, software, or a combination of software and hardware. Whether the functions are performed by using hardware or software depends on particular applications and design constraints of technical solutions. A person skilled in the art may use different methods to implement the described functions for each particular application, but it should not be considered that this implementation goes beyond the scope of this disclosure.

It should be noted that the memory described in this disclosure is intended to include, but not limited to, the memories as described herein and to any memory of another appropriate type.

It should be understood that sequence numbers of the foregoing processes do not mean execution sequences in various embodiments of this disclosure. The execution sequences of the processes should be determined according to functions and internal logic of the processes and should not be construed as any limitation on implementation processes of embodiments.

It may be clearly understood by a person skilled in the art that, for ease and brevity of description, for a detailed working process of the foregoing systems, apparatuses, and units, refer to a corresponding process in the foregoing method embodiments. Details are not described herein again.

In the several embodiments provided in this disclosure, it should be understood that the disclosed systems, apparatuses, and methods may be implemented in another manner. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions in embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this disclosure pertaining to fundamental aspects, or the part contributing to the current technology, or some of the technical solutions may be implemented in a form of a software product. The computer software product is stored in a storage medium, and includes a plurality of instructions for instructing a computer device (which may be a personal computer, a server, or a network device) to perform all or some of the steps of the methods described in embodiments of this disclosure. The foregoing storage medium includes any medium that can store program code, such as a USB flash drive, a removable hard disk, a read-only memory (ROM), a random access memory (RAM), a magnetic disk, or a compact disc.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on the computer, the procedures or functions according to embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

A person of ordinary skill in the art may understand that all or some of the steps of the methods in embodiments may be implemented by a program instructing related hardware. The program may be stored in a computer-readable storage medium. The storage medium may include a ROM, a RAM, a magnetic disk, or an optical disc, or the like.

The foregoing describes in detail the device management method, the apparatus, and the computer system that are provided in embodiments of this disclosure. Principles and implementations of this disclosure are described by using specific examples. The descriptions of the foregoing embodiments are merely illustrative to facilitate an understanding of the disclosed embodiments. In addition, a person of ordinary skill in the art can make variations and modifications to the specific implementations as may be apparent to them, all such variations and modifications being encompassed by the accompanying claims.

What is claimed is:

1. A method for managing a plurality of devices connected to a switching device by a plurality of ingress ports, the method comprising:
   obtaining, by the switching device, information about each of the devices connected to the plurality of ports of the switching device, the information being included in a first packet received by the switching device from each of the plurality of devices connected to each specific ingress port; and
   determining, by the switching device, response ports of the plurality of ports of the switching device based on the information about each of the devices connected to the plurality of ports, wherein different response ports are connected to different devices, and each response port is configured to receive a management packet or a response to the management packet that is sent by a device connected to each response port in a device enumeration process.

2. The method according to claim 1, wherein:
   each ingress port of the switching device corresponds to one port register, and the port register is configured to record the information about the device connected to each ingress port; and
   after the obtaining, by a switching device, information about each of the devices connected to the plurality of ingress ports, updating, by the switching device, information recorded in the port register corresponding to each specific ingress port.

3. The method according to claim 1, further comprising:
   sending, by the switching device, a second packet to each device connected to each ingress port, the second packet comprising information about the switching device.

4. The method according to claim 1, wherein the determining, by the switching device, response ports of the plurality of ports of the switching device comprises:
   traversing, by the switching device, the information about the devices connected to each of the plurality of ports;
   determining a response port corresponding to each device connected to the plurality of ports, and when at least two ports are connected to a same device, determining one of the at least two ports to be the response port corresponding to the device, and processing the other of the at least two ports to be non-response ports.

5. The method according to claim 1, wherein each of the response ports of the switching device comprise an uplink port, and the determining, by the switching device, response ports of the plurality of ports of the switching device comprises:
   determining, by the switching device, the uplink port based on the information about each of the plurality of devices connected to the plurality of ports, the uplink port being configured to receive a management packet that is sent in the device enumeration process.

6. The method according to claim 5, wherein the determining, by the switching device, the uplink port based on the information about each of the plurality of devices connected to the plurality of ports comprises:
   determining, by the switching device, whether a processor exists in each of the plurality of devices connected to the plurality of ports; and
   determining, by the switching device, a port connected to the processor of each of the plurality of devices as the uplink port.

7. The method according to claim 5, wherein the determining, by the switching device, the uplink port based on the information about each of the plurality of devices connected to the plurality of ports comprises:
   determining, by the switching device, devices connected to the plurality of ports do not include a processor; and
   receiving, by the switching device, a third packet and determining the uplink port based on the third packet.

8. The method according to claim 1, wherein the information about each device comprises device type and a device identifier.

9. A switching device, comprising:
   a memory storing instructions; and
   a processor coupled to the memory, wherein the instructions, when executed by the processor, cause the switching device to:
   obtain information about each of a plurality of devices connected to a plurality of ports of the switching device, the information being included in a first packet received by the switching device from each of the plurality of devices connected to each of the plurality of ports; and determine response ports of the plurality of ports of the switching device based on the information about each of the devices connected to the plurality of ports, wherein different response ports are connected to different devices, and each response port is configured to receive a management packet or a response to the management packet that is sent by a device connected to each response port in a device enumeration process.

10. The switching device according to claim 9, wherein each port of the switching device corresponds to one port register configured to record the information about the device connected to each port, the instructions, when executed by the processor, cause the switching device to:

update information recorded in the port register corresponding to each port.

11. The switching device according to claim 9, wherein the instructions, when executed by the processor, cause the switching device to:

send a second packet to each device connected to each port, wherein the second packet comprises information about the switching device.

12. The switching device according to claim 9, wherein when determining response ports of the switching device based on the information about the devices connected to the plurality of ports, the instructions, when executed by the processor, cause the device to:

traverse the information about the devices connected to the plurality of ports;

determine a response port corresponding to each device connected to the plurality of ports, and when at least two ports are connected to a same target device:
 determine one of the at least two ports as a response port corresponding to the target device; and
 process other of the at least two connected ports as non-response ports.

13. The switching device according to claim 9, wherein the response ports of the switching device comprise an uplink port, and:

when determining the response ports of the switching device, the instructions, when executed by the processor, cause the switching device to:
 determine the uplink port based on the information about the devices connected to the plurality of ports, wherein the uplink port is configured to receive a management packet that is sent in the device enumeration process.

14. The switching device according to claim 13, wherein when determining the uplink port based on the information about the devices connected to the plurality of ports, the instructions, when executed by the processor, cause the device to:

determine whether a processor exists in each of the plurality of devices connected to the plurality of ports; and determine a port connected to the processor of each of the plurality of devices as the uplink port.

15. The switching device according to claim 13, wherein when determining the uplink port, the instructions, when executed by the processor, cause the switching device to:

determine that the devices connected to the plurality of ports do not include a processor; and receive a third packet and determine the uplink port based on the third packet.

16. The switching device according to claim 9, wherein the information about each device comprises device type and a device identifier.

17. The switching device according to claim 9, wherein the instructions, when executed by the processor, cause the switching device to:

determine, based on the information about the devices connected to the plurality of ports, an acceleration device connected to the switching device, access the acceleration device, and map configuration space of the acceleration device to the switching device.

18. A computer system, wherein the computer system comprises a switching device and a plurality of devices connected to the switching device;

each device being configured to send information about the device to the switching device; and the switching device is configured to:
 obtain information about each device connected to a plurality of ports of the switching device, the information being included in a first packet received by the switching device from each of the plurality of devices connected to each specific port; and
 determine response ports of the switching device based on the information about the devices connected to the plurality of ports, wherein different response ports of the switching device are connected to different devices, and each response port is configured to receive a management packet or a response to the management packet that is sent by a device connected to each response port in a device enumeration process.

* * * * *